United States Patent Office 3,522,235
Patented July 28, 1970

3,522,235
WATER-INSOLUBLE AZO DYESTUFFS
Thomas Douglas Baron and Brian Ribbons Fishwick, Manchester, England, assignors to Imperial Chemical Industries Limited, London, England, a corporation of Great Britain
No Drawing. Continuation-in-part of application Ser. No. 480,119, Aug. 16, 1965. This application Sept. 19, 1968, Ser. No. 761,001
Claims priority, application Great Britain, Aug. 26, 1964, 34,944/64
Int. Cl. C07c 107/06; C09b 29/24
U.S. Cl. 260—207
5 Claims

ABSTRACT OF THE DISCLOSURE

Water-insoluble azo dyestuffs derived from a diazo component oftheb enzene series and a coupling component of the formula

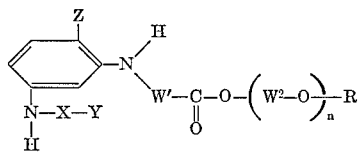

wherein

X is —CO—, —SO$_2$— or —COO—

Y is lower alkyl, chloro lower alkyl, bromo lower alkyl, lower alkoxy lower alkyl, cyclohexyl, benzyl, phenyl, tolyl or methoxyphenyl;
Z is hydrogen, lower alkyl or lower alkoxy;
R is lower alkyl;
W' and W$^2$ are each lower alkylene; and
n is an integer of from 1 to 10; and the use of the said dyestuffs for colouring synthetic textile materials.

---

This is a continuation-in-part application of application Ser. No. 480,119 which was filed on Aug. 16, 1965, now abandoned.

This invention relates to new monoazo dyestuffs and more particularly it relates to new water-insoluble monoazo dyestuffs which are valuable for colouring synthetic textile materials.

According to the invention there are provided the water-insoluble monoazo dyestuffs which are free from carboxylic acid and sulphonic acid groups and which are represented by the formula:

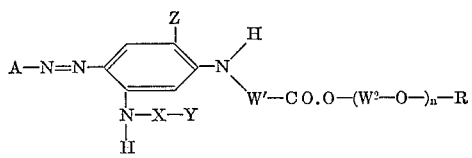

wherein

A is the radical of a diazo component of the benzene series which is directly attached to the azo group through a carbon atom of said benzene ring;
X is selected from the group consisting of —CO—, —SO$_2$— and

Y is selected from the group consisting of lower alkyl, chloro lower alkyl, bromo lower alkyl, lower alkoxy lower alkyl, cyclohexyl, benzyl, phenyl, tolyl and methoxyphenyl;

Z is selected from the group consisting of hydrogen, lower alkyl and lower alkoxy;
R is a lower alkyl radical;
W' and W$^2$ each independently represent lower alkylene radicals; and
n is a positive integer of from 1 to 10.

Throughout this specification the terms "lower alkyl" and "lower alkoxy" are used to denote alkyl and alkoxy radicals respectively containing from 1 to 4 carbon atoms. The term "lower alkylene" radical is used to denote an alkylene radical containing from 1 to 6 carbon atoms.

As examples of the lower alkyl radicals represented by Z and R there may be mentioned ethyl, propyl, butyl and, preferably, methyl radicals; and as examples of the lower alkoxy radicals represented by Z there may be mentioned ethoxy, propoxy, butoxy and, preferably, methoxy radicals.

As examples of the lower alkylene radicals represented by W' and W$^2$ there may be mentioned methylene, propylene, trimethylene, tetramethylene, α:β-dimethylethylene, α:γ-dimethyltrimethylene, hexamethylene and, preferably, ethylene radicals.

As examples of the radicals represented by Y there may be mentioned lower alkyl such as methyl, ethyl, n-propyl and n-butyl, chloro lower alkyl such as β-chloroethyl and β- or γ-chloro-n-propyl, bromo lower alkyl such as β-bromoethyl, and lower alkoxy lower alkyl such as β-(methoxy or ethoxy) ethyl and β- or γ-(methoxy or ethoxy)-n-propyl.

It is however preferred that X represents the —CO— group and Y a lower alkyl radical, so that the group —X—Y preferably represents an acyl radical of the formula —CO—Y' wherein Y' is a lower alkyl radical, preferably the methyl radical.

It is preferred that the integer represented by n is an integer of from 1 to 3, and, above all, n preferably represents 1. When n has a value of from 2 to 10 then it is not necessary that each radical represented by W$^2$ has the same value; thus for example when n is 2 one W$^2$ can be the ethylene radical and the other W$^2$ the trimethylene radical.

The radical of a diazo component of the benzene series represented by A is preferably a phenyl radical which may contain up to four substituents selected from the group consisting of lower alkyl, lower alkoxy, chlorine, bromine, nitro, lower alkyl sulphonyl, β-cyanoethylsulphonyl, trifluoromethyl, cyano, thiocyano, carbonamido (—CONH$_2$), sulphonamido (—SO$_2$NH$_2$), N-lower alkyl sulphonamido, N:N-di(lower alkyl) sulphonamido, N-lower alkyl carbonamido, N:N-di(lower alkyl) carbonamido, N-phenyl sulphonamido, N-phenyl carbonamido, carbo lower alkoxy (lower alkoxycarbonyl), bromo lower alkoxy carbonyl, chloro lower alkoxy carbonyl and acetoxy lower alkoxycarbonyl.

As specific examples of such substituents which may be present on the phenyl radical represented by A there may be mentioned methyl, methoxy, ethoxy, ethylsulfonyl, n-propylsulphonyl, N-methylsulphonamido, N-ethylsulphonamido, N-n-butylsulphonamido, N-methyl-N - ethylsulphonamido, N:N - diethylsulphonamido, N-methylcarbonamido, N:N-diethylcarbonamido, carbomethoxy, carboethoxy, β-bromoethoxycarbonyl, β-chloroethoxycarbonyl and γ-acetoxy-n-propoxycarbonyl.

Above all it is preferred that A represents a radical of the formula:

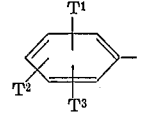

wherein

T¹ is selected from the group consisting of hydrogen, lower alkyl, lower alkoxy, chlorine, bromine, nitro, lower alkylsulphonyl, β-cyanoethylsulphonyl, trichloromethyl, cyano, thiocyano, carbonamido, sulphonamido, N-lower alkyl carbonamido, N:N-di(lower alkyl)carbonamido, N-lower alkyl sulphonamido, N:N-di(lower alkyl) sulphonamido, N-phenyl carbonamido, N-phenyl-sulphonamido, carbo lower alkoxy, bromo lower alkoxy carbonyl, acetoxy lower alkyl carbonyl and chloro lower alkoxy carbonyl:

T² is selected from the group consisting of hydrogen, cyano, nitro, chlorine, bromine and carbo lower alkoxy; and T³ is selected from the group consisting of hydrogen, chlorine, bromine, nitro and cyano.

Preferably A is a radical of the formula:

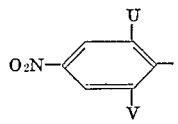

wherein

U is selected from the group consisting of hydrogen, nitro, chlorine, bromine, cyano, lower alkyl sulphonyl, trifluoromethyl and carbo lower alkoxy; and V is selected from the group consisting of hydrogen, chlorine, bromine and nitro.

Above all A is a radical selected from the group consisting of 2:4-dinitro-6-chlorophenyl, 2:4-dinitro-6-bromophenyl and 2:4:6-trinitrophenyl.

As specific examples of groups of the formula:

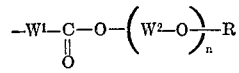

there may be mentioned β-(β'-methoxyethoxycarbonyl)ethyl, β-(β'-ethoxyethoxycarbonyl)ethyl, β - (γ-methoxybutoxycarbonyl)ethyl, β - (γ'-methoxpropoxycarbonyl)ethyl, β - (β'-butoxyethylcarbonyl)ethyl, (β - methoxyethoxycarbonyl)methyl, β - (β' - ethoxethoxycarbonyl)butyl, β-(β'-isopropoxyethoxycarbonyl)ethyl, β-methoxymethoxycarbonyl)ethyl, β-[β'-[β'' methoxethoxy)ethoxycarbonyl]ethyl and β - {β'-[β''-(β''' - methoxyethoxy)ethoxy]ethoxycarbonyl}ethyl.

The azo dyestuffs of the invention can be obtained by diazotising a primary amine of the benzene series of the formula A—NH₂, and coupling the resulting diazo compound with a coupling component of the formula

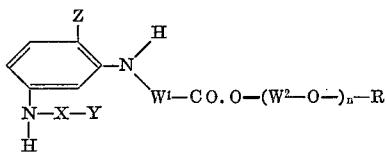

wherein A, R, X, Y, Z, W¹, W² and n have the meanings stated above, the primary amine and coupling component being free from carboxylic acid or sulphonic acid groups.

This reaction can be conveniently brought out by adding an aqueous solution or suspension of the diazotised primary amine to a solution of the coupling component in a dilute aqueous solution of an acid such as hydrochloric acid, stirring the resulting mixture, preferably at a pH between 3 and 7, to effect formation of the monoazo dyestuff, and finally isolating the monoazo dyestuff by conventional methods.

The diazotised primary amines used in this reaction can be any diazotised primary amines of the benzene series. As specific examples of primary amines of the benzene series there may be mentioned aniline, o-, m- or p-toluidine, o-, m- or p-anisidine, o-, m- or p-chloroaniline, o-, m- or p-bromoaniline, o-, m- or p-nitroaniline, 2:5-dichloroaniline, 2:4-dinitroaniline, 2:4-dinitro-6-(chloro or bromo)aniline, 4-methanesulphonylaniline, 4-aminobenzotrifluoride, 4- or 5-nitro-2-toluidine, 4- or 5-nitro-2-anisidine, 4- or 5-chloro-2-anisidine, 4- or 5-chloro-2-toluidine, 4- or 5-bromo-2-anisidine, 2:6-di(chloro- or bromo-)-4-nitroaniline, 2:4:6-trinitroaniline, 2:4-dinitro-6-carbomethoxyaniline, 2-amino-5-nitrobenzotrifluoride, 2:4-bis(methanesulphonyl)aniline, 2-(chloro- or bromo-)-4-nitroanilinemethylanthranilate, 4- or 5-nitromethylanthranilate, 4-aminobenzamide, 2:6-di(chloro- or bromo-)aniline-4-sulphonamide, 2:6-di(chloro- or bromo-)-4-methylsulphonylaniline, 2:5-di(chloro- or bromo-)-4:6-dinitroaniline, 2-amino-3:5-dinitrobenzotrifluoride, 3-amino-2-(chloro- or bromo-)-4:6-dinitro-(toluene or anisole), 3-amino-4-(chloro- or bromo-)-2:6-dinitro-(toluene or anisole), 2- or 4-cyanoaniline, 4-nitro-2-cyanoaniline, 2:4-dinitro-6-cyanoaniline, 2-nitro-4-cyanoaniline, 2-chloro-4-cyanoaniline, 3-amino-2:4:6-trinitrotoluene, 2-(chloro- or bromo-) - 4 - methylsulphonylaniline, 3 - (chloro- or bromo-)-4-thiocyanoaniline, 2-(chloro- or bromo-)-4-sulphamylaniline, 2-amino - 5 - nitrophenylmethanesulphone, 2 - amino - 3:5-dinitrophenylmethylsulphone, 2-amino-3-(chloro- or bromo-) - 5 - nitrophenylmethylsulphone, 2-sulphamyl-4-nitroaniline, 2-methylsulphamyl-4-nitroaniline, 2-phenylsulphamyl-4-nitroaniline, 2-ethylsulphamyl-4-nitroaniline, 2-butylsulphamyl-4-nitroaniline, 2-dimethylsulphamyl-4 - nitroaniline, 2 - methylsulphamyl-4:6-dinitroaniline, 2 - methylsulphamyl-4-nitro-6-(chloro- or bromo-)aniline, 2-phenylsulphamyl-4-nitroaniline, 4-carbonamidoaniline, methyl 2-amino - 3 - (chloro- or bromo-)-5-nitrobenzoate, dimethyl 2-aminoterephthalate, and dimethyl 2-amino-5-nitroterephthalate.

The coupling components of Formula I can themselves be obtained by esterifying a compound of the formula:

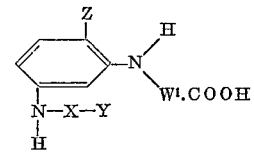

with an alcohol of the formula: HO—(W²—O)ₙ—R wherein Z, X, Y, W¹, W², R and n have the meanings stated, or by esterifying a compound of the formula:

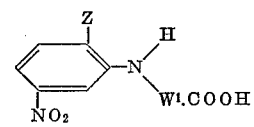

with an alcohol of the formula: HO—(W²—O)ₙ—R, reducing the nitro group to a primary amino group, and finally acylating the primary amino group, so as to convert the —NH₂ group to a —NH.X.Y group.

As specific examples of the coupling components of Formula I there may be mentioned 2 methoxy-5-acetylamino - [N-(β'-methoxyethoxycarbonyl)ethyl]aniline, 3-acetylamino - N-[β-(β'-ethoxyethoxycarbonyl)ethyl]aniline, 3 - benzoylamino-N-[β-(β'-ethoxyethoxycarbonyl)ethyl]aniline, 2-methoxy-5-acetylamino-N - [β-(γ'-methoxybutoxycarbonyl)ethyl]aniline, 2-methoxy-5 - acetylamino - N-[β-(γ'-methoxypropoxycarbonyl)ethyl]aniline, 2-methoxy-5-acetylamino-N - {β-[β'-(β'-methoxyethoxy)ethoxycarbonyl]ethyl}aniline, 2-ethoxy-5-acetylamino-N-[β-(β'-methoxyethoxycarbonyl)-ethyl]aniline, 2-methyl-5-acetylamino - N-[β-(β'-methoxyethoxycarbonyl)ethyl] aniline, 2-ethoxy-5-acetylamino - N - [β-(β'-ethoxyethoxycarbonyl)ethyl]aniline, 2 - methoxy-5-propionylamino-N-[β-(β'-methoxyethoxycarbonyl)ethyl]aniline, 2-methoxy-5 - benzoylamino - N - [β-(β'-methoxyethoxycarbonyl)ethyl]aniline, 2-methoxy-5-methylsulphonylamino-N-[β-(β'-methoxyethoxycarbonyl)ethyl]aniline, 2-methoxy-5-chloroacetylamino - N - [β-(β'-methoxyethoxycarbonyl)ethyl]aniline, 2-methoxy-5-methoxyacetylamino - N - [β-(β'-methoxyethoxycarbonyl)ethyl]aniline and 2-methoxy-5-methoxycarbonylamino - N - [β-(β'-methoxyethoxycarbonyl)ethyl]aniline.

A preferred class of the dyestuffs of the invention comprises those dyestuffs wherein n has a value of from 1 to 3, and above all the dyestuffs wherein n has a value of 1.

A second preferred class of the dyestuffs of the invention comprises the dyestuffs of the formula:

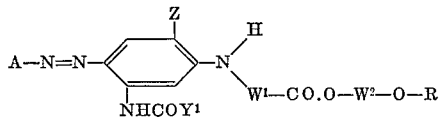

wherein A, R, $W^1$, $W^2$, $Y^1$ and Z have the meanings stated.

A third preferred class of the dyestuffs of the invention comprises the dyestuffs of the formula:

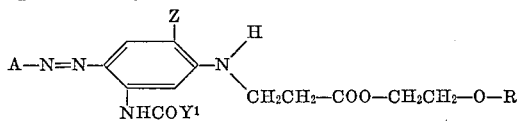

wherein A, R, $Y^1$ and Z have the meanings stated.

In these classes A preferably has the preferred values given above.

A fourth preferred class of the dyestuffs of the invention comprises the dyestuffs of the formula:

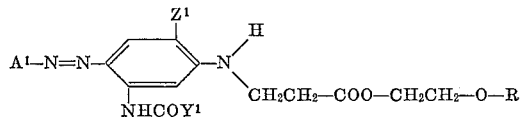

wherein $A^1$ is 2:4-dinitro-6-chlorophenyl, 2:4-dinitro-6-bromophenyl or 2:4:6-trinitrophenyl, R is lower alkyl, $Z^1$ is lower alkoxy and $Y^1$ is lower alkyl.

The monoazo dyestuffs, as hereinbefore defined, are valuable for colouring synthetic textile materials, for example cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn, or woven or knitted fabric.

Such textile materials can conveniently be coloured with the monoazo dyestuffs, as hereinbefore defined, my immersing the textile material in a dyebath comprising an aqueous dispersion of one or more of the said dyestuffs, which dyebath preferably contains a non-ionic, cationic and/or anionic surface-active agent, and thereafter heating the dyebath for a period at a suitable temperature. In the case of secondary cellulose acetate textile materials it is preferred to carry out the dyeing process at a temperature between 60° and 85° C.; in the case of cellulose triacetate or polyamide textile material it is preferred to carry out the dyeing process at 95° to 100° C.; in the case of aromatic polyester textile materials the dyeing process can either be carried out at a temperature between 90° and 100° C. preferably in the presence of a carrier such as diphenyl or o-hydroxydiphenyl, or at a temperature above 100° C., preferably at a temperature between 120° and 130° C., under superatmospheric pressure.

Alternatively the aqueous dispersion of the said monoazo dyestuff can be applied to the textile material by a padding or printing process, followed by heating or steaming of the textile material. In such processes it is preferred to incorporate a thickening agent, such as gum tragacanth, gum arabic, or sodium alginate, into the aqueous dispersion of the said monoazo dyestuff.

At the conclusion of the colouring process it is preferred to give the coloured textile material a rinse in water or a brief soaping treatment before finally drying the coloured textile material. In the case of aromatic polyester textile materials it is also preferred to subject the coloured textile material to a treatment in an alkaline aqueous solution of sodium hydrosulphite before the soaping treatment in order to remove loosely attached dyestuff from the surface of the textile material.

The monoazo dyestuffs have excellent affinity and building up properties on synthetic textile materials, and in particular on aromatic polyester textile materials, so enabling deep shades to be obtained. The resulting colorations which range in shade from yellow to blue, have excellent fastness to light, to wet treatments, and, in particular, to dry heat treatments such as those carried out at high temperatures during pleating operations.

If desired the dyestuffs of the invention can be applied to synthetic textile materials in conjunction with other disperse dyes.

The invention is illustrated but not limited by the following examples in which the parts are by weight.

EXAMPLE 1

2.62 parts of 2:4-dinitro-6-bromoaniline are added during 30 minutes to a solution of nitrosylsulphuric acid at 25° C., which is prepared by dissolving 0.7 part of sodium nitrite in 8 parts of sulphuric acid, and the resulting mixture is then stirred for 2 hours at 55° to 60° C. The resulting solution of the diazo compound is added to a solution of 3.1 parts of 2-methoxy-5-acetylamino-[β-(β'-methoxyethoxycarbonyl)ethyl]aniline in a mixture of 60 parts of acetone and 60 parts of a 0.2 M aqueous solution of hydrochloric acid at 5° C., and the mixture is stirred for a further 30 minutes. The dyestuff which is precipitated is then filtered off, washed with water and dried.

When dispersed in aqueous medium the dyestuff dyes polyethylene terephthalate textile materials in navy blue shades which have excellent fastness to light and to dry heat treatments.

The 2-methoxy-5-acetylamino - N - [β - (β'-methoxyethoxycarbonyl)ethyl]aniline used in the above example was itself obtained by condensing 2-methoxy-5-nitroaniline with acrylic acid, esterifying the resulting 2-methoxy-5-nitro-N-(β-carboxyethyl)aniline with β - methoxyethanol in the presence of sulphuric acid, reducing the nitro group to an amino group and finally acylating this amino group by treatment with one molecular proportion of acetic anhydride in pyridine at a temperature of 20° C.

EXAMPLE 2

2.41 parts of 2:4-dinitro-6-(methoxycarbonyl)aniline are added to a solution of nitrosylsulphuric acid, which is prepared by dissolving 0.7 part of sodium nitrite in 8 parts of sulphuric acid at 25° C., and the resulting mixture is stirred for 2 hours at 5° C. The resulting solution of the diazo compound is added to a solution of 3.24 parts of 2 - methoxy - 5-acetylamino-N-[β-(β'-methoxyethoxycarbonyl)propyl]aniline in a mixture of 60 parts of acetone and 60 parts of a 0.2 N aqueous solution of hydrochloric acid, the temperature of the mixture being maintained at 5° C. by external cooling. The mixture is stirred for a further 30 minutes at 5° C., and the precipitated dyestuff is then filtered off, washed with water and dried.

When dispersed in aqueous medium the dyestuff dyes polyethyleneterephthalate textile materials in navy blue shades which have excellent fastness to light and to dry heat treatments.

The 2-methoxy-5-acetylamino - N - [β-(β'-methoxyethoxycarbonyl)propyl]aniline used in the above example was itself obtained by condensing o-anisidine with methacrylic acid, nitrating the product with a mixture of nitric and sulphuric acids, esterifying the resulting 2-methoxy-5-nitro-N-(β-carboxypropyl)aniline with β - methoxyethanol in the presence of sulphuric acid, reducing the nitro group to an amino group, and finally converting the primary amino group to an acetylamino group.

EXAMPLE 3

2.62 parts of 2:4-dinitro-6-bromoaniline are diazotised as described in Example 1, and the resulting solution of the diazo compound is added to a solution of 3.24 parts of 2-ethoxy-5-acetylamino-N-[β-(β'-methoxyethoxycarbonyl)ethyl]aniline in 100 parts of a 0.2 N aqueous solution of hydrochloric acid, the temperature of the mixture being maintained between 5° and 10° C. by external cooling. The mixture is stoved for a further 30 minutes at the same temperature, and the precipitated dyestuff is then filtered off, washed with water and dried.

When dispersed in aqueous medium the dyestuff dyes polyethyleneterephthalate textile materials in navy blue shades which possess excellent fastness to light and to dry heat treatments.

The coupling component used in this example was obtained in a similar manner to the coupling component of Example 1 except that 2-ethoxy-5-nitroaniline was used as the starting material instead of 2-methoxy-5-nitroaniline.

EXAMPLE 4

A solution of 1.74 parts of 2-chloro-4-nitroaniline in a mixture of 15 parts of acetic acid and 10 parts of a concentrated aqueous solution of hydrochloric acid is cooled to 5° C., a solution of 0.7 part of sodium nitrite in 10 parts of water is added with stirring, and the mixture stirred for 15 minutes. The mixture so obtained is added to a solution of 2.8 parts of 3-acetylamino-N-[β-(β'-methoxyethoxycarbonyl)ethyl]aniline in 100 parts of a 0.2 N aqueous solution of hydrochloric acid at 5° C., and the mixture is stirred for 30 minutes. A solution of 10 parts of sodium acetate in 50 parts of water is then added and the precipitated dyestuff is filtered off, washed with water and dried.

When dispersed in aqueous medium the dyestuff dyes polyethylene terephthalate textile materials in deep bluish-red shades having excellent fastness to dry heat treatments.

The following table gives further examples of the water-insoluble azo dyestuffs of the invention having the formula:

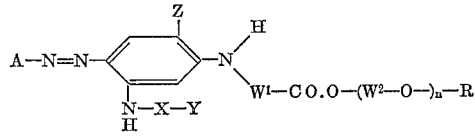

the symbols of which have the values given in the respective columns of the table, and the shades of dyeings obtained from the said dyestuffs are given in the last column of the table.

The said dyestuffs may be obtained by methods similar to those described in Examples 1 to 4 by diazotising the appropriate amines of the formula: A—NH$_2$, and coupling the resulting diazo compounds with the appropriate coupling components of Formula I.

| Ex. | A | X | Y | Z | W$^1$ | W$^2$ | n | R | Shade |
|---|---|---|---|---|---|---|---|---|---|
| 5 | 2:4-dinitro-6-chlorophenyl | —CO— | Methyl | Methoxy | Ethylene | Ethylene | 1 | Methyl | Greenish navy blue. |
| 6 | 2:4-dinitro-6-bromophenyl | —CO— | do | do | do | do | 1 | Ethyl | Navy blue. |
| 7 | do | —CO— | do | do | do | do | 2 | do | Do. |
| 8 | do | —CO— | do | do | do | do | 1 | n-Propyl | Do. |
| 9 | do | —CO— | do | do | do | do | 1 | n-Butyl | Do. |
| 10 | do | —CO— | do | do | do | do | 2 | do | Do. |
| 11 | do | —CO— | do | do | do | do | 2 | Methyl | Greenish navy blue. |
| 12 | do | —CO— | do | do | do | do | 3 | do | Do. |
| 13 | do | —CO— | do | do | do | Methylene | 1 | do | Do. |
| 14 | do | —CO— | do | do | do | Trimethylene | 1 | do | Do. |
| 15 | do | —CO— | do | do | Isopropylene | Ethylene | 1 | do | Navy blue. |
| 16 | do | —CO— | do | do | Methylene | do | 1 | do | Reddish navy blue. |
| 17 | do | —CO— | do | do | α-Methylethylene | do | 1 | do | Navy blue. |
| 18 | 2:4-dinitro-6-chlorophenyl | —CO— | do | do | Tetramethylene | do | 1 | do | Do. |
| 19 | 2:4-dinitro-6-bromophenyl | —CO— | do | do | α:β-Dimethylethylene | do | 1 | do | Do. |
| 20 | 2:4-dinitro-6-chlorophenyl | —CO— | do | do | Hexamethylene | do | 1 | do | Do. |
| 21 | do | —CO— | do | do | Ethylene | Hexamethylene | 1 | do | Do. |
| 22 | 2:4-dinitro-6-bromophenyl | —CO— | do | do | do | α-Methyltrimethylene | 1 | do | Do. |
| 23 | do | —CO— | do | do | do | Ethylene | 1 | iso-Propyl | Do. |
| 24 | do | —CO— | do | do | do | do | 1 | α:α-Dimethylethyl | Do. |
| 25 | 2:4-dinitro-6-chlorophenyl | —CO— | do | do | do | Trimethylene | 1 | Methyl | Greenish navy blue. |
| 26 | do | —CO— | do | do | do | Ethylene | 3 | do | Do. |
| 27 | 2:4-dinitro-6-bromophenyl | —CO— | do | do | do | Trimethylene | 1 | Ethyl | Do. |
| 28 | do | —CO— | do | do | do | Ethylene | 3 | do | Do. |
| 29 | 2:4-dinitro-6-cyanophenyl | —CO— | do | do | do | do | 1 | Methyl | Greenish-blue. |
| 30 | 2-chloro-4-nitro-6-(carbomethoxy)phenyl | —CO— | do | do | do | do | 1 | do | Violet. |
| 31 | 2:4-dinitro-6-(carbomethoxy)phenyl | —CO— | do | do | do | do | 1 | do | Navy blue. |
| 32 | 2:4-dinitro-6[β-(methoxy)ethoxycarbonyl]phenyl | —CO— | do | do | do | do | 1 | do | Do. |
| 33 | 2-bromo-4-nitro-6-cyanophenyl | —CO— | do | do | do | do | 1 | do | Greenish navy blue. |
| 34 | 2:6-dibromo-4-nitrophenyl | —CO— | do | do | do | do | 1 | do | Reddish-violet. |
| 35 | 2:6-dichloro-4-nitrophenyl | —CO— | do | do | do | do | 1 | do | Do. |
| 36 | 2:5-dichloro-4:6-dinitrophenyl | —CO— | do | do | do | do | 1 | do | Reddish navy blue. |
| 37 | 2:4-dinitro-6-trifluoromethylphenyl | —CO— | do | do | do | do | 1 | do | Greenish navy blue. |
| 38 | 2-trifluoromethyl-4-nitrophenyl | —CO— | do | do | do | do | 1 | do | Bluish red. |
| 39 | 2-cyano-4-nitrophenyl | —CO— | do | do | do | do | 1 | do | Violet. |
| 40 | 2-methylsulphonyl-4-nitrophenyl | —CO— | do | do | do | do | 1 | do | Reddish-violet. |
| 41 | 2:4-dinitro-6-methylsulphonylphenyl | —CO— | do | do | do | do | 1 | do | Greenish navy blue. |
| 42 | 2-bromo-4-nitro-6-methylsulphonylphenyl | —CO— | do | do | do | do | 1 | do | Bluish violet. |
| 43 | 2:5-di(carbomethoxy)-4-nitrophenyl | —CO— | do | do | do | do | 1 | do | Bluish red. |
| 44 | 2:4-dinitro-6-chlorophenyl | —CO— | do | Ethoxy | do | do | 1 | do | Greenish navy blue. |

| Ex. | A | X | Y | Z | W¹ | W² | n | R | Shade |
|---|---|---|---|---|---|---|---|---|---|
| 45 | 2:4-dinitro-6-bromophenyl | —CO— | ....do.... | n-Propoxy | ....do.... | ....do.... | 1 | ....do.... | Navy blue. |
| 46 | ....do.... | —CO— | ....do.... | n-Butoxy | ....do.... | ....do.... | 1 | ....do.... | Do. |
| 47 | ....do.... | —CO— | ....do.... | Methoxy | ....do.... | ....do.... | 1 | ....do.... | Violet. |
| 48 | ....do.... | —CO— | ....do.... | Ethyl | ....do.... | ....do.... | 1 | ....do.... | Do. |
| 49 | ....do.... | —CO— | ....do.... | ....do.... | ....do.... | ....do.... | 1 | ....do.... | Navy blue. |
| 50 | 2:4-dinitro-6-chlorophenyl | —CO— | Ethyl | Methoxy | ....do.... | ....do.... | 1 | ....do.... | Greenish navy blue. |
| 51 | 2:4-dinitro-6-bromophenyl | —CO— | n-Butyl | ....do.... | ....do.... | ....do.... | 1 | ....do.... | Navy blue. |
| 52 | ....do.... | —CO— | Phenyl | ....do.... | ....do.... | ....do.... | 1 | ....do.... | Greenish navy blue. |
| 53 | ....do.... | —CO— | Cyclohexyl | ....do.... | ....do.... | ....do.... | 1 | ....do.... | Do. |
| 54 | ....do.... | —CO— | 2-methoxy-phenyl | ....do.... | ....do.... | ....do.... | 1 | ....do.... | Do. |
| 55 | ....do.... | —CO— | 4-methyl-phenyl | ....do.... | ....do.... | ....do.... | 1 | ....do.... | Do. |
| 56 | ....do.... | —COO— | Methyl | ....do.... | ....do.... | ....do.... | 1 | ....do.... | Navy blue. |
| 57 | 2:4-dinitro-6-chlorophenyl | —COO— | Ethyl | ....do.... | ....do.... | ....do.... |  | ....do.... | Greenish navy blue. |
| 58 | ....do.... | —COO— | iso-Propyl | ....do.... | ....do.... | ....do.... | 1 | ....do.... | Navy blue. |
| 59 | ....do.... | —COO— | Phenyl | ....do.... | ....do.... | ....do.... | 1 | ....do.... | Greenish navy blue. |
| 60 | 2:4-dinitro-6-bromophenyl | —SO₂— | Methyl | ....do.... | ....do.... | ....do.... | 1 | ....do.... | Violet. |
| 61 | ....do.... | —SO₂— | Ethyl | ....do.... | ....do.... | ....do.... | 1 | ....do.... | Do. |
| 62 | 2:4-dinitro-6-chlorophenyl | —SO₂— | p-Tolyl | ....do.... | ....do.... | ....do.... | 1 | ....do.... | Do. |
| 63 | 2:4-dinitro-6-bromophenyl | —CO— | Benzyl | ....do.... | ....do.... | ....do.... | 1 | ....do.... | Navy blue. |
| 64 | ....do.... | —CO— | Methoxymethyl | ....do.... | ....do.... | ....do.... | 1 | ....do.... | Do. |
| 65 | ....do.... | —CO— | Chloromethyl | ....do.... | ....do.... | ....do.... | 1 | ....do.... | Do. |
| 66 | 4-nitrophenyl | —CO— | Methyl | Hydrogen | ....do.... | ....do.... | 1 | ....do.... | Scarlet. |
| 67 | 4-chlorophenyl | —CO— | ....do.... | ....do.... | ....do.... | ....do.... | 1 | ....do.... | Orange. |
| 68 | Phenyl | —CO— | ....do.... | ....do.... | ....do.... | ....do.... | 1 | ....do.... | Reddish-yellow. |
| 69 | 2:5-dichloro-4-nitrophenyl | —CO— | ....do.... | ....do.... | ....do.... | ....do.... | 1 | ....do.... | Red. |
| 70 | 2:4-bis(methylsulphonyl)phenyl | —CO— | ....do.... | ....do.... | ....do.... | ....do.... | 1 | ....do.... | Scarlet. |
| 71 | 2:6-dichloro-4-methylsulphamyl)-phenyl | —CO— | ....do.... | ....do.... | ....do.... | ....do.... | 1 | ....do.... | Orange. |
| 72 | 2:4-dicyanophenyl | —CO— | ....do.... | ....do.... | ....do.... | ....do.... | 1 | ....do.... | Red. |
| 73 | 2-cyano-4-nitrophenyl | —CO— | ....do.... | ....do.... | ....do.... | ....do.... | 1 | ....do.... | Rubine. |
| 74 | 2-methylsulphonyl-4-nitrophenyl | —CO— | ....do.... | ....do.... | ....do.... | ....do.... | 1 | ....do.... | Do. |
| 75 | 2-carbomethoxy-4-nitrophenyl | —CO— | ....do.... | ....do.... | ....do.... | ....do.... | 1 | ....do.... | Bluish-red. |
| 76 | 2-(carbomethoxy)-phenyl | —CO— | ....do.... | ....do.... | ....do.... | ....do.... | 1 | ....do.... | Orange. |
| 77 | 2:4:6-trinitrophenyl | —CO— | ....do.... | Methoxy | ....do.... | ....do.... | 1 | ....do.... | Bluish-green. |
| 78 | 2:4-dinitro-6-bromophenyl | —CO— | ....do.... | ....do.... | ....do.... | ....do.... | 4 | ....do.... | Greenish navy blue. |
| 79 | ....do.... | —CO— | ....do.... | ....do.... | ....do.... | ....do.... | 5 | ....do.... | Do. |
| 80 | ....do.... | —CO— | ....do.... | ....do.... | ....do.... | ....do.... | 6 | ....do.... | Do. |
| 81 | ....do.... | —CO— | ....do.... | ....do.... | ....do.... | ....do.... | 10 | ....do.... | Do. |
| 82 | 2:4-dinitro-5-methyl-6-chlorophenyl | —CO— | ....do.... | ....do.... | ....do.... | ....do.... | 1 | ....do.... | Violet. |
| 83 | 2:4-dinitro-3-methoxy-6-chlorophenyl | —CO— | ....do.... | ....do.... | ....do.... | ....do.... | 1 | ....do.... | Do. |
| 84 | 4-nitro-2-carbamoylphenyl | —CO— | ....do.... | Hydrogen | ....do.... | ....do.... | 1 | ....do.... | Bluish-red. |
| 85 | 2:6-dichloro-4-sulphamylphenyl | —CO— | ....do.... | ....do.... | ....do.... | ....do.... | 1 | ....do.... | Red. |
| 86 | 2-bromo-4-thiocyanophenyl | —CO— | ....do.... | ....do.... | ....do.... | ....do.... | 1 | ....do.... | Reddish orange. |
| 87 | 2-n-butylsulphamyl-4-dinitrophenyl | —CO— | ....do.... | ....do.... | ....do.... | ....do.... | 1 | ....do.... | Navy blue. |
| 88 | 2-diethylsulphamyl-4:6-dinitrophenyl | —CO— | ....do.... | ....do.... | ....do.... | ....do.... | 1 | ....do.... | Do. |
| 89 | 2-phenylsulphamyl-4:6-dinitrophenyl | —CO— | ....do.... | ....do.... | ....do.... | ....do.... | 1 | ....do.... | Do. |
| 90 | 2-phenylsulphonyl-4:6-dinitrophenyl | —CO— | ....do.... | ....do.... | ....do.... | ....do.... | 1 | ....do.... | Do. |
| 91 | 2-phenylcarbamoyl-4-nitrophenyl | —CO— | ....do.... | Hydrogen | ....do.... | ....do.... | 1 | ....do.... | Bluish-red. |
| 92 | 2-n-propylcarbamoyl-4:6-dinitrophenyl | —CO— | ....do.... | Methoxy | ....do.... | ....do.... | 1 | ....do.... | Navy-blue. |
| 93 | 2-dimethylcarbamoyl-4:6-dinitrophenyl | —CO— | ....do.... | ....do.... | ....do.... | ....do.... | 1 | ....do.... | Do. |
| 94 | 2-β-cyanoethylsulphonyl-4-nitrophenyl | —CO— | ....do.... | ....do.... | ....do.... | ....do.... | 1 | ....do.... | Do. |
| 95 | 2-β-chloroethoxycarbonyl-4-nitrophenyl | —CO— | ....do.... | ....do.... | ....do.... | ....do.... | 1 | ....do.... | Do. |
| 96 | 2-β-bromoethoxycarbonyl-4:6-dinitrophenyl | —CO— | ....do.... | ....do.... | ....do.... | ....do.... | 1 | ....do.... | Do. |
| 97 | 2-γ-acetoxypropoxycarbonyl-4:6-dinitrophenyl | —CO— | ....do.... | ....do.... | ....do.... | ....do.... | 1 | ....do.... | Do. |
| 98 | 2:4:6-tricyanophenyl | —CO— | ....do.... | ....do.... | ....do.... | ....do.... | 1 | ....do.... | Blue. |
| 99 | 2:4:6-tribromophenyl | —CO— | ....do.... | Hydrogen | ....do.... | ....do.... | 1 | ....do.... | Orange. |
| 100 | 2:4:5-trichlorophenyl | —CO— | ....do.... | ....do.... | ....do.... | ....do.... | 1 | ....do.... | Do. |
| 101 | 2:3:4:5-tetrachlorophenyl | —CO— | ....do.... | ....do.... | ....do.... | ....do.... | 1 | ....do.... | Do. |
| 102 | 2:4-dinitro-6-bromophenyl | —CO— | Bromomethyl | ....do.... | ....do.... | ....do.... | 1 | ....do.... | Navy blue. |
| 103 | ....do.... | —CO— | ....do.... | Ethoxy | ....do.... | ....do.... | 1 | Ethyl | Do. |
| 104 | ....do.... | —CO— | Ethyl | Methoxy | ....do.... | ....do.... | 1 | n-Propyl | Do. |

The coupling components used in Examples 78 to 81 were themselves obtained by condensing 2-methoxy-5-nitroaniline with acrylic acid, esterifying the resulting 2-methoxy-5-nitro-N-(β-carboxyethyl)analine with the appropriate alcohol of the formula HO—(C₂H₄—O)$_t$—CH₃, wherein $t$ has a value of 4, 5, 6 or 10, in the presence of sulphuric acid, reducing the nitro group to an amino group, and finally acylating the amino group by treatment with one molecular proportion of acetic anhydride in pyridine at a temperature of 20° C.

The alcohols of the formula HO—(C₂H₄—O)$_t$—CH₃ where $t$ has the values given above were themselves obtained as follows:

$t=4$ (methoxy tetraglycol): α-methoxy-β-(β'-hydroxyethoxy)-ethane was reacted with thionyl chloride and the resulting compound of the formula CH₃(OC₂H₄)₂Cl was reacted with the monosodium salt of ethylenediglycol.

$t=5$ (methoxypentaglycol): The compound of the formula CH₃(OC₂H₄)₂Cl was reacted with the monosodium salt of ethylene triglycol.

$t=6$ (methoxyhexa-glycol): $CH_3(OC_2H_4)_3OH$ was reacted with thionyl chloride and the resulting $$CH_3(OC_2H_4)_3Cl$$

was then reacted with the monosodium salt of ethylene triglycol.

$t=10$ $(CH_3(OC_2H_4)_{10}OH)$: methoxypentaglycol was reacted with thionyl chloride to yield $CH_3(OC_2H_4)_5Cl$ which was then reacted with the monosodium salt of ethylene pentaglycol.

We claim:

1. The water-insoluble monoazo dyestuffs which are free from carboxylic acid and sulphonic acid groups and which are represented by the formula:

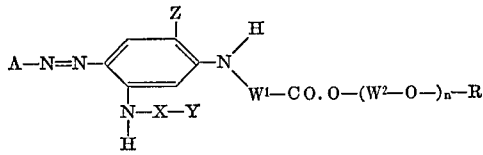

wherein

A represents a phenyl radical which may contain up to four substituents selected from the group consisting of lower alkyl, lower alkoxy, chlorine, bromine, nitro, lower alkylsulphonyl, β-cyano-ethylsulphonyl, trifluoromethyl, cyano, thiocyano, carbonamido (—$CONH_2$), sulphonamido (—$SO_2NH_2$), N-lower alkyl sulphonamido, N:N-di(lower alkyl) sulphonamido, N-lower alkyl carbonamido, N:N-di-(lower alkyl)carbonamido, N-phenylsulphonamido, N-phenylcarbonamido, carbo lower alkoxy (lower alkoxycarbonyl), bromo lower alkoxycarbonyl, chloro lower alkoxycarbonyl and acetoxy lower alkoxycarbonyl;

X is selected from the group consisting of —CO—, —$SO_2$— and

wherein

Y is selected from the group consisting of lower alkyl, chloro lower alkyl, bromo lower alkyl, lower alkoxy lower alkyl, cyclohexyl, benzyl, pheny, tolyl and methoxy-phenyl;

Z is selected from the group consisting of hydrogen, lower alkyl and lower alkoxy;

R is a lower alkyl radical;

$W^1$ and $W^2$ each independently represent lower alkylene radicals; and n is a positive integer of from 1 to 3.

2. Water-insoluble monoazo dyestuffs as claimed in claim 1 wherein A is a radical of the formula:

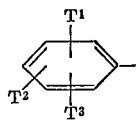

wherein $T^1$ is selected from the group consisting of hydrogen, lower alkyl, lower alkoxy, chlorine, bromine, nitro, lower alkylsulphonyl, β-cyanoethylsulphonyl, trifluoromethyl, cyano, thiocyano, carbonamido, sulphonamido, N-lower alkyl carbonamide, N:N-di(lower alkyl)carbonamido, N - lower alkylsulphonamido, N:N - di - (lower alkyl)sulphonamido, N-phenylcarbonamide, N-phenylsulphonamido, carbo lower bromo lower alkoxycarbonyl, chloro lower alkoxycarbonyl and acetoxy lower alkoxycarbonyl;

$T^2$ is selected from the group consisting of hydrogen, cyano, nitro, chlorine, bromine and carbo lower alkoxy; and $T^3$ is selected from the group consisting of hydrogen, chlorine, bromine, nitro and cyano.

3. Water-insoluble monoazo dyestuffs as claimed in claim 1 wherein A is a radical of the formula:

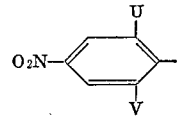

wherein

U is selected from the group consisting of hydrogen, nitro, chlorine, bromine, cyano, lower alkylsulphonyl trifluoromethyl and carbo lower alkoxy; and V is selected from the group consisting of hydrogen, chlorine, bromine and nitro.

4. The water-insoluble monoazo dyestuffs as claimed in claim 1 which are of the formula:

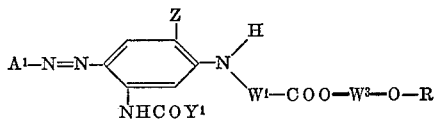

wherein $A^1$ is selected from the group consisting of 2:4-dinitro-6-chlorophenyl, 2:4-dinitro-6-bromophenyl and 2:4:6-trinitrophenyl;

$Y^1$ is lower alkyl;

R is lower alkyl;

$W^1$ and $W^2$ each represent lower alkylene; and

Z is selected from the group consisting of hydrogen, lower alkyl and lower alkoxy.

5. The water-insoluble monoazo dyestuffs as claimed in claim 1 which are of the formula:

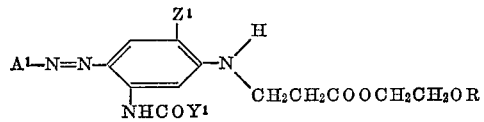

wherein $A^1$ is selected from the group consisting of 2:4-dinitro-6 - chlorophenyl, 2:4 - dinitro-6-bromophenyl and 2:4:6-trinitrophenyl;

$Z^1$ is lower alkoxy;

$Y^1$ is lower alkyl; and

R is lower alkyl.

References Cited

UNITED STATES PATENTS 3,097,198    7/1963    Fishwick et al. _____ 260—207.1

OTHER REFERENCES 1,069,313   11/1959   Germany.

CHARLES B. PARKER, Primary Examiner

C. F. WARREN, Assistant Examiner

U.S. Cl. X.R.

8—26, 41, 50; 260—207.1